United States Patent Office 3,239,328
Patented Mar. 8, 1966

3,239,328
COMPOSITION FOR TREATMENT OF CUT FLOWERS, LEAVES AND BRANCHES AND METHOD FOR PRODUCING SAME
John B. Sheppard, 1009 S. Beckham Ave., Tyler, Tex.
No Drawing. Filed May 26, 1964, Ser. No. 370,375
17 Claims. (Cl. 71—2.4)

This invention relates to the treatment of cut flowers, leaves, branches, and other portions of plants which have been severed from the plant system, and, in particular relates to a composition which is adapted to be dissolved in water in which the severed plants are placed so as to preserve, prolong, and enhance the useful life of such plants. Another phase of the invention relates to the preparation of the composition in dry, substantially stable and free-flowing form in which all of the ingredients are maintained in proper distribution and in which all ingredients are readily soluble or dispersible in water.

This application is a continuation-in-part of my copending United States application S.N. 189,976, filed April 25, 1962, now abandoned.

In my copending U.S. patent application S.N. 90,216, now U.S. Patent 3,134,661, of which the present application represents an improvement, a composition is disclosed which includes a cut-flower nutrient such as sucrose in combination with benzoic acid, salicylanilide and a wetting agent. These ingredients act synergistically to accomplish the following:

(1) Provide a source of nutrition capable of being utilized by the flower or other plant material, so that it will continue to mature and develop.

(2) Provide a means of slowing down the respiration or metabolism of the flower or other plant material, so that the useful life after cutting is prolonged.

(3) Keep the water-conducting vessels and tissue of the flower stem open and functioning, so that the flower can draw water as needed.

(4) Harden the stems, prevent wilting and shattering of the blossoms.

(5) Retard or prevent the development of molds and bacteria in the water, which would otherwise clog the water-conducting tubes and result in damage to the flower.

(6) Produce a specific acidity (approximately pH 4.0) in the water solution, which acidity has been found to enhance the performance of flower preservatives.

It has now been discovered that a product of superior antiseptic properties may be produced by the incorporation of iodine into the composition. Further, it has been discovered that the useful life of the solution made from the composition can be prolonged by the incorporation of small quantities of certain metal salts and chlorinated phenols in special manner in the composition.

It is an object of this invention to provide a new and improved combination of ingredients for treatment of cut flowers, leaves, branches, and other severed portions of plants.

Another general object of the invention is to provide a multi-purpose plant preservative and nutrient composition for cut flowers or other plants which will insure good appearance for a long period of time.

Another object of the invention is the provision of a composition of the type described wherein the various ingredients cooperate in a special manner to provide the necessary chemical reactions to allow the cut flowers or plants to continue their development, prevent bacterial attack, and regulate their growth so that a more prolonged and useful life may be achieved.

Another object of the invention is to provide the novel plant treating composition in granular, free-flowing form readily soluble or dispersible in water and which will not cake or discolor under normal storage conditions.

A further object is to provide a method for the preparation of the plant treating composition in the aforesaid dry, granular, readily water soluble form.

Another object of the invention is to provide a plant treating composition and a method of preparing same in which ingredients heretofore believed incompatible with each other are combined in a useful manner.

Another object of the invention is the provision of an iodine-containing cut flower composition wherein the iodine is combined in a novel stable form.

Another object of the invention is to provide a method for the incorporation of iodine in cut flower compositions.

The composition of the invention in its broad aspects, comprises constituents which include a major proportion of a water soluble nutrient which can be utilized by the cut flower or other portion of the plant as an energy source and minor amounts of benzoic acid, salicylanilide, iodine, and a non-ionic wetting agent. In general, the proportions of these ingredients can vary between the following limits (all proportions being specified as approximate parts by weight):

FORMULA A

| | |
|---|---:|
| Nutrient (sucrose or dextrose) | 5,000–50,000 |
| Benzoic acid | 60–500 |
| Salicylanilide | 10–100 |
| Iodine | 6–50 |
| Wetting agent | up to 25 |

The composition in dry form is utilized to prepare an aqueous solution in which the amounts of the ingredients set forth will be present in parts per million by weight approximately the same quantities as designated above, that is, the nutrient will be present in the solution in approximately 5,000 to 50,000 parts per million by weight, the benzoic acid approximately 60 to 500 parts per million by weight, etc.

It will be understood that the proportions can be varied to best suit the particular flowers or plants being treated.

A modified composition which has been determined to further extend the useful life of solutions in which it is employed has the following approximate proportions:

FORMULA B

| | |
|---|---:|
| Nutrient (sucrose or dextrose) | 5,000–50,000 |
| Benzoic acid | 60–500 |
| Salicylanilide | 10–100 |
| Iodine | 6–50 |
| Zinc salt | 1–25 |
| Chlorinated phenol | 1–25 |
| Wetting agent | up to 25 |

In the modified composition it has been found that the amount of salicylanilide is preferably on the lower side of the range given, about 20 to 25 parts per million having been found optimal.

A difficulty frequently encountered with cut flower solutions is lack of sufficient antiseptic power to avoid ultimate spoilage of the solutions prepared from a nutrient composition when in the presence of certain organisms. These are encountered, for example, with cut roses which frequently harbor a bacteria which leads to spoilage of the solution in a matter of days (an acid pH and sugar content favoring such spoilage). A different type of spoilage is encountered when nutrient solutions are used with column stocks which are notorious in the floral industry for producing a contamination of any water in which they are placed. The usual brute-force attack on the problem consists of increasing the percentages of antiseptic in the preservative until the spoilage is prevented. However, such an increased concentration of antiseptics will usually adversely affect the flowers and may result in wilting, browning or other discoloration. According to the present invention, the problem is solved by the use of traces of antiseptic or bacteriostatic substances which work in combination to produce results which otherwise would require much larger proportions.

In the modified composition, Formula B, the small amounts of zinc salts and phenols are present in concentrations far below the amounts recognized as having the necessary antiseptic action, but are apparently capable of combining with the other components of the composition to enhance the overall antiseptic power to the required extent.

The zinc salt employed in the modified formula can be any of a number of water-soluble zinc salts, but the acetate is preferred because of its general characteristics of stability and solubility. For example, I have found that a small addition of zinc acetate (sufficient to provide less than 10 parts per million in the solution) provides a definite increase in the keeping quality of carnations.

The chlorinated phenol of the modified formula may be one of the commercially available trichlorophenols known to have antiseptic properties. For example, I have found that an amount of hexachlorophene (2,2'-methylene-bis[3,4,6-trichlorophenol]) sufficient to provide a solution containing about 10 parts per million when added to the composition in combination with the other ingredients, will provide effective control of water contamination from stem bacteria and fungus under the most adverse conditions.

While any of the great number of nutrients known to the art may be used in the present composition, the nutrient generally employed consists mainly of sugar, such as sucrose or dextrose. This is employed as a base material to which the other ingredients are added in the desired quantities and proportions.

The sugar provides a source of nutrition capable of being utilized by the flower or other plant so that it will continue to mature and develop. Either sucrose or dextrose or combinations thereof (as well as other carbohydrates) may be employed. However, the preferred nutrient is sucrose, particularly where the composition is to be used in the treatment of roses.

While proportions of nutrient sufficient to provide from about 5,000 to 50,000 parts by weight per million parts of water may be used, to facilitate storing, packaging and shipping and provide a more economical and less bulky product, I usually employ a weight proportion of sugar to water solution in the range of 10,000 to 15,000 p.p.m. This ration will allow a two-fluid ounce measure of the composition to properly treat one gallon of water. In general, the exact proportion of the chosen nutrient is non-critical and the amount used per gallon of water is more nearly governed by bulk and cost factors as set forth above.

The benzoic acid functions as a stimulant for the growth of the cut flowers or plants and maintains the pH of the water into which the stems are immersed at about 4.2 to 4.5 which range of acidity results in excellent performance of the other ingredients of the composition. If the solution becomes more alkaline the blossoms will wilt more rapidly and if the pH falls substantially below 4, the stems will not remain rigid and fibrous. Benzoic acid has been found superior to all known acidic substances in the present combination of ingredients. Besides its acidic effects, benzoic acid retards the development of both bacteria and fungi, and acts as a powerful stimulant.

When used alone, benzoic acid will cause rapid maturing of blossoms followed by early shattering. In order to control the stimulating action of the benzoic acid and take advantage of its desired effect, the composition makes use of salicylanilide, which functions to retard development and lower the respiration of the flower. Salicylanilide also has a fungus retarding action. The two-fold action of the benzoic acid and salicylanilide, when used in properly balanced proportions, results in a measurable lengthening of cut flower life. The combination of stimulating and restraining factors produces a controlled development and growth of the cut flower, or other plant material, such as greenery or foliages.

The desired effects of the benzoic acid and salicylanilide are enhanced by the use of a small amount of wetting agent of the non-ionic type. The wetting agents known under the name "Tween," sold by the Atlas Powder Company and said to be polyoxyethylene derivatives of hexitol anhydride partial long chain fatty acid esters, have been found to be especially suitable. The wetting agent must be compatible with the other ingredients of the composition and must not adversely affect plant life. The quantity of wetting agent must be limited, since too much wetting agent has been found to prevent absorption by the flower stem, resulting in rapid wilting. With wetting agents of the "Tween" type, the upper limit is about 25 p.p.m. with lesser amounts providing better results.

The wetting agent also insures that the water-conducting vessels and tissues of the flower stem will remain open in order for the blossoms to draw nutrient when necessary.

Since the benzoic acid and salicylanilide have diverse effects on the rate of growth and maturing of the flowers, it is deirable that a balance between them must be maintained. Good results are obtained with ratios of benzoic acid versus salicylanilide ranging between about 17 to 1 and 1 to 1. Optimum results for Formula A are obtained between the ratios of about 2 to 1 and 2.5 to 1 using between 30 and 60 p.p.m. of salicylanilide. Where additional antiseptics are employed, as in the modified Formula B, the amount of salicylanilide is reduced so that the optimum ratio of benzoic acid to salicylanilide in this instance, may be in the order of 5–10 to 1.

As previously described, both the benzoic acid and salicylanilide have antiseptic properties but the quantities of these two constituents which can be used is limited by the water solubility of salicylanilide, it being difficult to dissolve more than about 75 p.p.m. in tap water.

A composition of greatly enhanced antiseptic value is obtained by the incorporation of iodine in the manner hereinafter described. Stable iodine-containing compositions are notoriously difficult to prepare. The composition of my copending application S.N. 90,216 was prepared by dissolving benzoic acid, salicylanilide and wetting agent in an organic solvent, preferably ethanol, and then mixing this solution with sugar granules and evaporating the solution to coat the sugar granules with a film of the dissolved chemicals. Attempts were made to incorporate iodine into the composition by dissolving iodine in the above-described ethanol solution but the results were unsatisfactory. Iodine is a difficult material to work with since it is volatile, unstable, corrosive, and has marked staining effects. The addition of iodine to the ethanol solution results in the production of severe vapors which not only indicate a rapid loss of iodine, but represent a hazard to the eyes and lungs of personnel. When the mixing operation was carried to completion, a composition was obtained which while having good initial preservative characteristics, proved unstable upon prolonged storage and eventually lost its iodine through vaporization.

Thus the use of iodine presents two serious problems: the formation of severe vapors on addition to the solution and the instability of the final product. In accordance with this invention, the first of these problems is overcome by the use of a chlorinated organic solvent. Particularly good results have been obtained by using 1,1,1-trichloroethane as the solvent in which the benzoic acid, salicylanilide, iodine and wetting agent are dissolved. The use of 1,1,1-trichloroethane as a solvent not only eliminates the excessive vaporization of iodine but the vapors of the solvent itself are nonflammable making its use additionally advantageous.

The chemicals dissolved in the 1,1,1-trichloroethane solvent are coated onto sugar granules by adding sugar to the solution and simultaneously tumbling and evaporating the resulting mixture in a cylindrical drum as described in copending U.S. patent application 90,216, now U.S. Patent 3,134,661.

In accordance with another feature of this invention, the instability of the iodine containing coating is overcome by chemically combining the iodine with the other ingredients of the composition to form a final stabilized composition. A chemical combination apparently takes place by treating the iodized product with light-containing short wave components. The exposure of trays of the product to outside sunlight, fluorescent lights or ultraviolet sources causes a change to take place which is evidenced by the color of the composition turning from rich brown to light golden yellow. The compositions containing iodine, both before and after treatment with the light source, have been found to provide a marked reduction in water fouling as compared with the previous composition which did not contain iodine. However, the light-converted combined iodine product is greatly preferred because of its iodine stability in storage.

The amount of iodine to be used in formulating the composition may vary between about 12 to 50 p.p.m. with 25 p.p.m. giving excellent results. Analysis of the final light-treated product reveals that about one-half the iodine used is in chemically combined form with the remainder of the iodine being lost during the process by vaporization.

Tests were run to determine with which constituent of the composition iodine combined. The greatest observable reaction was obtained between iodine and salicylanilide, this effect being so pronounced as to cause significant color changes in the salicylanilide when exposed to the vapors from iodine crystals. No color change was observed with similar treatment of both benzoic acid and sugar. However, it was determined that the pH of samples of the stabilized final product varied from 4.2 to 4.5 as compared with a pH of 4.0 obtained with similar products which did not contain iodine.

In the procedure set forth above all of the ingredients of the composition were combined in Chlorothene, which solvent makes the use of iodine in the composition practical by limiting the effect of the vapors. I have found that a reduction in the amount of Chlorothene may be accomplished by dissolving the iodine and salicylanilide in a small amount of this solvent and applying this to the nutrient sugar separately from the solution containing the wetting agent. The benzoic acid may be dissolved in either solution. The application of moderate heat to the Chlorothene affects the solution of the iodine in a very short time. The heavy nature of Chlorothene prevents a serious loss of iodine and contamination of the air in the mixing room. In fact, the Chlorothene may be heated to boiling without apparent loss of iodine vapors. Separate dissolution of the iodine and of the wetting agent and separate application to the nutrient sugar is dictated by the fact that these two ingredients are incompatible in concentrated Chlorothene solutions with the wetting agent tending to settle out as a gum.

Where zinc salts and chlorinated phenols are used in the composition, as in the modified Formula B, the iodine, chlorinated phenol and salicylanilide are advantageously dissolved in Chlorothene, whereas the zinc salt, benzoic acid and wetting agent are dissolved together in another solvent such as ethyl alcohol. Zinc acetate is only slightly soluble in Chlorothene and wetting agents of the Tween types are normally incompatible with trichlorophenols. However, the two solutions are quite readily prepared separately and are conveniently separately applied to the nutrient sugar to provide a resulting coated product dissolvable in water to provide the dilute aqueous nutrient preservative solution. In this solution the various ingredients appear quite compatible and, in fact, as pointed out above, seem to complement each other insofar as antiseptic properties are concerned.

The following examples serve to further illustrate the invention:

*Example 1*

The ingredients used to formulate the composition of this example were as follows:

| | P.p.m. |
|---|---|
| Sucrose | 13,000 |
| Benzoic acid | 120 |
| Salicylanilide ("Shirlan Extra") | 60 |
| Polyoxyethylene sorbitan monooleate (Tween 80) | 20 |
| Iodine (elemental) | 25 |

The iodine crystals and Tween were dissolved in a portion 1,1,1-trichloroethane ("Chlorothene"). The salicylanilide was then dissolved in the solution adding "Chlorothene" as required. The solution was allowed to sit for three hours to permit possible interreactions between the constituents following which the benzoic acid was dissolved in the solution. The solution was poured over the sucrose followed by simultaneously mixing the components and evaporating the solvent in a tumbling drum. After the evaporation of the solvent, there was obtained a rich brown product comprising the sucrose coated with a film of the chemicals which had been dissolved in the "Chlorothene" solution. This product was sifted to remove lumps. It may be used directly as a cut flower composition but release of iodine makes it undesirable for prolonged storage.

The sifted product was spread in trays and exposed to sunlight for 30 hours yielding a final product which was light golden yellow in color. Chemical analysis of samples of this final product revealed a combined iodine content of between 0.08 and 0.09%. No free iodine was found. The final product was found to be stable, even against further exposure to light, and exhibited excellent properties as a preservative when mixed with water.

*Example 2*

The following is a representative procedure for preparation of a thirty pound batch of the modified Formula B composition:

| | Grams |
|---|---|
| Benzoic acid | 175 |
| Zinc acetate | 8 |
| Tween 80 | 15 |

The above three items are placed in a glass vessel with a vented cap and heated with approximately one pint of denatured ethyl alcohol to the boiling point of the alcohol. The solution above described is added to a 30 lb. batch of sucrose (or dextrose) while still very hot. This speeds drying and avoids condensation of water due to any refrigeration effect. The tumbling machine has been described above, but any arrangement for continually tumbling or stirring the batch of sucrose in the presence of adequate ventilation is satisfactory. After the first coating of the sucrose or dextrose granules is nearly dry (or completely dry if time permits) a second solution is applied from the following formulation:

| | Grams |
|---|---|
| Salicylanilide ("Shirlan Extra") | 25 |
| Hexachlorophene | 10 |
| Iodine crystals | 25 |

These three items are placed in a glass vessel (lightly vented) and heated with approximately one pint of Chlorothene to the boiling point of the Chlorothene. The heating action is continued until solution of all the iodine is obtained. It will be noted that the vapors do not rise or develop any appreciable pressure in the container, so no serious loss of iodine occurs at this point. Apparently, the salicylanilide, hexachlorophene and iodine combine together in this heated solution to produce a more potent and stable antiseptic composition than would be due to the individual effect of the separate components. When solution is completed, this second liquid is poured over the previously treated 30 lb. batch of sucrose (or dextrose, etc.) and the mixture again tumbled until dry. In this case it is better to allow the solution to partially cool prior to tumbling.

When the mixture is reasonably dry, it is ready to be sifted and packaged. Using the foregoing procedure and using sucrose which has initially been sifted to remove lumps, it will be found that very few lumps due to mixing are encountered and the mixture is uniform in color and content.

The composition as used in commercial practice is mixed with tap water (or hotter, preferably) at the rate of two cups of the composition to eight gallons of water. One tablespoon of the composition can be mixed with one quart of water to produce the same concentration.

The approximate amounts of the various chemicals measured in grams for a 30 lb. mix correspond closely to the same number of parts per million in the final water solution. This solution will, therefore, contain:

|  | P.p.m. |
|---|---|
| Benzoic acid | 175 |
| Zinc acetate | 8 |
| Tween 80 (wetting and emulsifier agent) | 15 |
| Salicylanilide | 25 |
| Hexachlorophene | 10 |
| Iodine (or somewhat lesser amount depending on losses due to vaporization during processing) | 25 |

This solution has shown excellent results. The desired bacteriostatic effect is obtained under many conditions of use, the various solutions remaining free from bacterial growth and odor. This is quite unexpected in view of the small quantities of antiseptics employed. Salicylanilide cannot be made to dissolve sufficiently for any substantial bacterial control and hexachlorophene in the amounts used, would not be per se capable of any substantial antiseptic action. The two together and in combination with the other ingredients provide excellent control. Although hexachlorophene is reported to be antagonistic to Tween wetting agents, these two ingredients in combination provide a useful function in the present formulation and mixing method.

For convenience in storing, shipping and general use, the composition is prepared in the form of a powder. But if desired, it could be produced in the form of a tablet, paste or liquid. It may also be combined in any of these forms with other materials, such as floral bases supplying water to the stems of cut flowers in arrangements, etc., lending its benefits to such applications.

Having described my invention, it will be understood that such description has been given by way of illustration and example and not by way of limitation, reference for the latter purpose being made to the appended claims.

I claim:

1. A composition for preserving and enhancing the useful life of cut flowers and other severed portions of plants comprising about 5,000 to 50,000 parts by weight of plant nutrient sugar, about 60 to 500 parts by weight of benzoic acid, about 10 to 75 parts by weight of salicylanilide, about 6 to 50 parts by weight of iodine, at least part of which is chemically combined with said salicylanilide, and up to 25 parts by weight of a non-ionic wetting agent.

2. The composition as defined in claim 1 wherein the plant nutrient sugar is selected from the group consisting of dextrose and sucrose and mixtures thereof.

3. The composition as defined in claim 1 wherein the non-ionic wetting agent is a polyoxyethylene derivative of hexitol anhydride partial long chain fatty acid.

4. A water-soluble, substantially noncaking granular product for addition to water for preservation and enhancement of the useful life of cut flowers and other severed portions of plants comprising the composition of claim 1 wherein the particles of plant nutrient sugar have a surface coating comprising the benzoic acid, salicylanilide, combined iodine, and non-ionic wetting agent constituents of the composition.

5. An aqueous solution for treatment of cut flowers and other severed portions of plants, comprising 5,000 to 50,000 p.p.m. of a plant nutrient sugar, 60 to 500 parts by weight of benzoic acid, 10 to 75 parts by weight of salicylanilide, about 6 to 50 parts by weight of iodine at least part of which is chemically combined with said salicylanilide and up to 25 parts by weight of a non-ionic wetting agent, said solution having a pH of about 4.2 to 4.5.

6. A composition for preserving and enhancing the useful life of cut flowers and other severed portions of plants comprising about 5,000 to 50,000 parts by weight of plant nutrient sugar, about 60 to 500 parts by weight of benzoic acid, about 10 to 75 parts by weight of salicylanilide, about 6 to 50 parts by weight of iodine at least part of which is chemically combined with said salicylanilide, about 1 to 25 parts by weight of zinc acetate, about 1 to 25 parts by weight of hexachlorophene and up to 25 parts by weight of a non-ionic wetting agent.

7. A composition for preserving and enchancing the life of cut flowers and other severed portions of plants comprising about 10,000 to 15,000 parts by weight of sucrose, about 175 parts by weight of benzoic acid, about 8 parts by weight of zinc acetate, about 15 parts by weight of a non-ionic wetting agent of the sorbitan monooleate polyoxyethylene type, about 25 parts by weight of salicylanilide, about 10 parts by weight of hexachlorophene, and about 6 to 25 parts by weight of iodine chemically combined at least in part with said salicylanilide.

8. The composition of claim 7 in the form of discrete granules, said granules comprising particles of sucrose having a surface coating thereon composed of said benzoic acid, zinc acetate, wetting agent, salicylanilide, iodine and hexachlorophene.

9. A method for the production of a water-soluble cut flower and plant treating composition comprising dissolving elemental iodine, salicylanilide and benozic acid in a chlorinated alkane solvent to form a solution, placing said solution in contact with sugar granules, evaporating said chlorinated alkane solvent thereby coating said sugar granules with the previously dissolved chemicals and forming a product having a rich brown color.

10. The process of claim 9 wherein said chlorinated alkane solvent is 1,1,1-trichloroethane.

11. The process of claim 9 wherein said rich brown product is exposed to light until a product having a light golden color is obtained.

12. The process of claim 11 wherein said light treatment is effected by exposure to sunlight.

13. The process of claim 11 wherein said light treatment is effected by exposure to fluorescent light.

14. A method for the production of a water-dispersible cut flower and severed plant treating composition comprising dissolving benzoic acid, zinc acetate and a non-ionic wetting agent of the sorbitan monooleate polyoxyethylene type in alcohol to form a first solution, dissolving elemental iodine, salicylanilide and hexachlorophene in a chlorinated alkane solvent to form a second solution, and applying said solutions to sugar granules with evaporation of the solvents to form surface coatings of the previously dissolved chemicals on said sugar granules.

15. The method of claim 14 wherein the dissolved chemicals applied to the sugar granules are in the following approximate proportions on a parts by weight basis:

| | |
|---|---|
| Benzoic acid | 60–500 |
| Zinc acetate | 1–25 |
| Wetting agent | Up to 25 |
| Salicylanilide | 10–100 |
| Hexachlorophene | 1–25 |
| Iodine | 6–50 |

16. The method of claim 14 wherein the solvents are heated to facilitate dissolution of the chemicals and wherein at least the first solution is applied while hot to the sugar granules to thereby facilitate evaporation of the solvent.

17. The method of claim 14 wherein said first solution is applied to the sugar granules to form a surface coating of the chemicals on said granules prior to the application of the second solution.

References Cited by the Examiner

UNITED STATES PATENTS 2,805,137  9/1957  Clopton.
2,971,292  2/1961  Malecki.

OTHER REFERENCES

Hitchcock Vol., "Amer. Gror. Botany," vol. 16, pages 433 to 440 (page 434 particularly pertinent).

Martin, Guide to the Chemicals Used in Crop Protection, Canada Department of Agriculture, Third Ed. page 261 (1957).

LEWIS GOTTS, *Primary Examiner.*

JULIAN S. LEVITT, *Examiner.*